Figure 1:
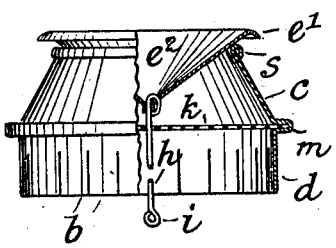

H. J. G. ADAMSON.
LID OF COOKING POTS AND OTHER VESSELS.
APPLICATION FILED OCT. 24, 1910.

993,811.

Patented May 30, 1911.

Witnesses

Inventor
Herbert J. G. Adamson
his Attorneys

UNITED STATES PATENT OFFICE.

HERBERT JAMES GORDON ADAMSON, OF HASTINGS, NEW ZEALAND, ASSIGNOR OF ONE-HALF TO JAMES ADAMSON, OF HASTINGS, HAWKES BAY, NEW ZEALAND.

LID OF COOKING-POTS AND OTHER VESSELS.

993,811.      Specification of Letters Patent.      Patented May 30, 1911.

Application filed October 24, 1910. Serial No. 588,838.

*To all whom it may concern:*

Be it known that I, HERBERT JAMES GORDON ADAMSON, a subject of the King of Great Britain and Ireland, &c., residing at Hastings, Hawkes Bay, in the Dominion of New Zealand, have invented certain new and useful Improvements in Lids of Cooking-Pots and other Vessels; and I do hereby declare the following to be a full, clear, and exact description of the invention, such as will enable others skilled in the art to which it appertains to make and use the same.

This invention relates to improvements in covers or lids of pots, kettles, and other vessels in which steam or gaseous matter is generated and in which valves are fitted to automatically prevent the boiling over which occurs when impervious covers are used.

The invention is applicable with covers of vessels of different sizes, shapes, and uses; and any suitable materials are employed as iron, tin, or other metal. Some persons prefer saucepan or vessel covers which allow of straining, or pouring out of matter while the cover remains on; these operations this invention facilitates when desired.

In the present case an open ended dome attached to the cover of the vessel is used, having seated upon it a valve arranged so as to prevent entry of dust into the vessel, and such that all parts are easy to clean. The valve is upwardly liftable, and is sufficiently light to be raised by slight internal steam or gaseous pressure. When boiling liquid within the vessel liberates steam, and the valve (in some cases made of aluminium), is raised by the internal pressure, an annular opening is produced by which the steam escapes so that boiling over of the liquid is prevented. The valve rim projects beyond the dome top, and there are means to enable the valve to be moved by hand into positions by which an opening will when required be left for continuous steam escape, the valve being released by hand, and allowed to fall to its seat at will. The dome has an under rim or flange by which it is secured or mounted upon the cover of the vessel, by bending the said flange outwardly, under the edges of a hole in the said cover. This flange is slitted to facilitate the bending, so that the operation may be readily performed by any ordinary person. Other means as riveting may be substituted, the use of solder being unnecessary, so that an element of weakness is thus avoided. The dome rises to any suitable height above the cover and has within it a perforated cross bar, bridge, or plate of apertured material through which extends a wire or like stem connected to and projecting down from the valve. The said perforated bar or plate acts as a guide and stop to the rise of the stem, so that the valve replaces itself on its seat after each rise due to steam pressure. The stem is either straight, or bent, corrugated, or indented, with an enlarged base formed by bending its lower end, to prevent high raising of the valve disengaging the stem from its guide. The dome can with proper machinery be readily and cheaply made of a single piece of metal, avoiding joints which if soldered would give way under excessive dry heat, and the whole of the construction is simple and durable.

Figure 2:
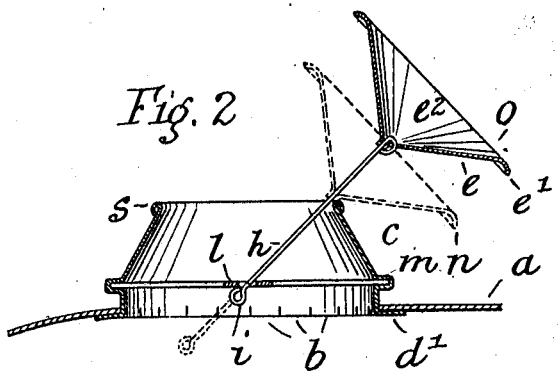
Figure 3:
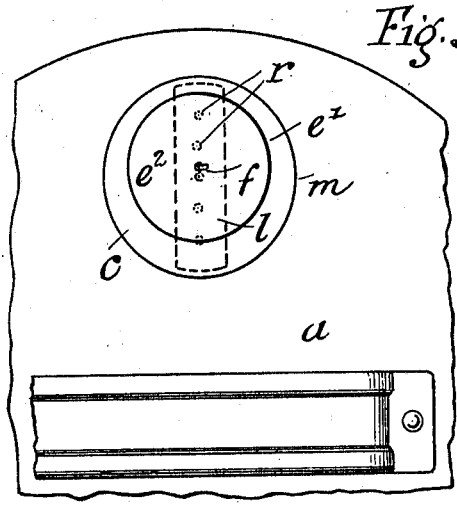
Figure 4:
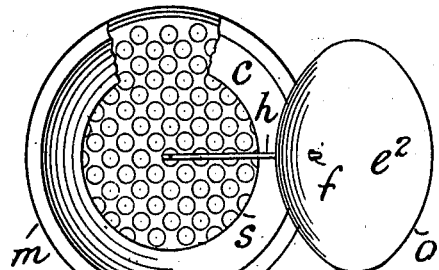
Figure 5:
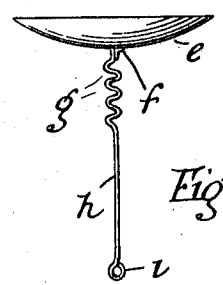
Figure 6:
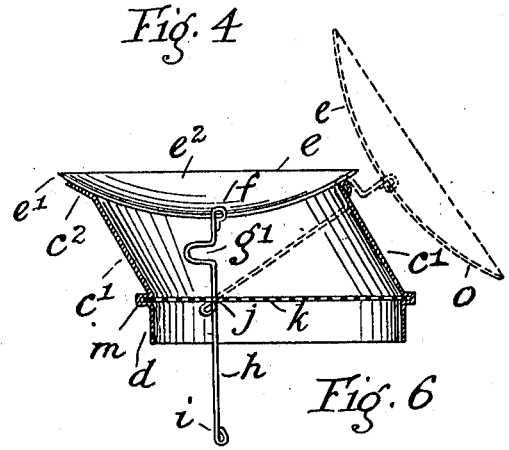

In the accompanying drawings, which form part of this specification, Figure 1 represents a side elevation, half in vertical section, of one form of dome with valve closed; Fig. 2 shows in vertical section my device in modified form attached to a vessel cover, the valve opened to its fullest extent being in firm lines, and in dotted lines open in a more usual position, in each case as hand placed, to allow of continuous steam escape without that repeated rise and fall of the valve which would automatically occur if the steam actuated it from the position of Fig. 1. Fig. 3 is a plan view of the construction in Fig. 2, but with the valve closed; Fig. 4 is a plan view of the parts in Fig. 1, but with the valve hand opened and part of the dome broken away. Fig. 5 is an elevation of a valve with corrugated stem. Fig. 6 illustrates in vertical section a modified construction which shows the valve closed in firm lines,—and, by dotted lines, in a hand opened position, to allow of steam escape, pouring out, or straining at will. The constructions usable are not limited to the precise details illustrated.

In these views *a* is part of a saucepan or other vessel cover, and *c* the dome, with under side flange *d*, with slits around it forming tongues or parts $b$, which are upturned as at $d^1$ against the underside of cover $a$, the latter shown in Fig. 2 of comparatively thick material, but in practice made as thin as desired.

$m$ is a flange around or enlargement near the base of the dome, resting on cover $a$.

$s$ is the dome upper rim, or seat of the valve, $e$, having at its top a concavity or dished surface $e^2$, and an edge $e^1$ extending beyond rim $s$ so that the edge can be grasped by hand to move the valve, or the valve may be raised by the pressure of a finger placed into recess $e^2$. The steam will lift vertically allowing the valve to fall back again each time, but the hand lifts are, as Figs. 2, 4, and 6 show, to one side enabling the valve to remain open until closed by hand. This side lift is, it is important to notice, effectible to any part of the circumference of rim $s$. In positions $n$, $o$, the valve is supported at or beyond one side of its seat. $o$ shows the most fully opened position, and $n$ the ordinary opened position of the valve. The stem, $h$, has an enlarged lower end $i$, such that the stem will not by any raising aforesaid become detached from its guide, which is plate or bridge $l$ having one or more apertures $r$; or a straining plate or screen $k$. The stem top is passed at $f$ up through a hole in the valve and down through another and then clenched. This stem passes through a suitable hole, not necessarily central, in plate $l$ or $k$, and this stem when of straight wire can stand so as to leave the valve in position $n$ or $o$, to allow of steam escape. This is due to the weight of the valve and the angle of the wire, when so set by hand as aforesaid. But in order to more securely locate the valve in one of these hand opened positions the stem is in some cases corrugated or kinked, as with a recess $g^1$ Fig. 6, or several corrugations as $g$, Fig. 5. In Fig. 6 there are inclined dome walls $c^1$ and a lip $c$ to facilitate the pouring out or straining (to one side of the cover) of matter from the saucepan or vessel.

The preferred constructions are above indicated, but a number of the minor details may obviously be varied.

What I claim is:—

1. A vessel-cover dome inclined to one side and having within it a straining device, means for connection of the dome to the cover, a valve resting on the dome, a stem from the valve passing through the straining device, and one or more recesses or corrugations in the stem for the purpose indicated.

2. The combination with a vessel cover of a dome for attachment thereto, a strainer secured within the dome, a valve formed of sheet metal and having its periphery extending beyond the upper edge of the dome, a stem securely fixed to the valve and loosely passing through the strainer, means carried by the stem for preventing the detachment of the same from the strainer when it is raised, and a recess in the stem for engaging the upper edge of the dome to support the valve in an open position, substantially as described.

3. The combination with a vessel cover of a dome for attachment thereto, a strainer secured within the dome, a valve formed of sheet metal and having its periphery extending beyond the upper edge of the dome, a stem rigidly fastened to the valve and passing through the strainer, and the stem terminating in an eye for preventing its detachment from the strainer and having a series of recesses adapted to engage the upper edge of the dome when the valve is raised and tilted, substantially as described.

In witness whereof I have hereunto set my hand in the presence of two witnesses.

HERBERT JAMES GORDON ADAMSON.

Witnesses:
HABERT THOMAS ANDERSON,
HERBERT RICHARD BEALE.

---

Copies of this patent may be obtained for five cents each, by addressing the "Commissioner of Patents, Washington, D. C."